Aug. 21, 1951  J. E. JOHNSON ET AL  2,565,452
REEL

Filed April 3, 1947  2 Sheets-Sheet 1

INVENTORS.
James E. Johnson
Charles R. Yuraua
BY
Hull & West,
ATTORNEYS

Aug. 21, 1951  J. E. JOHNSON ET AL  2,565,452
REEL
Filed April 3, 1947  2 Sheets-Sheet 2
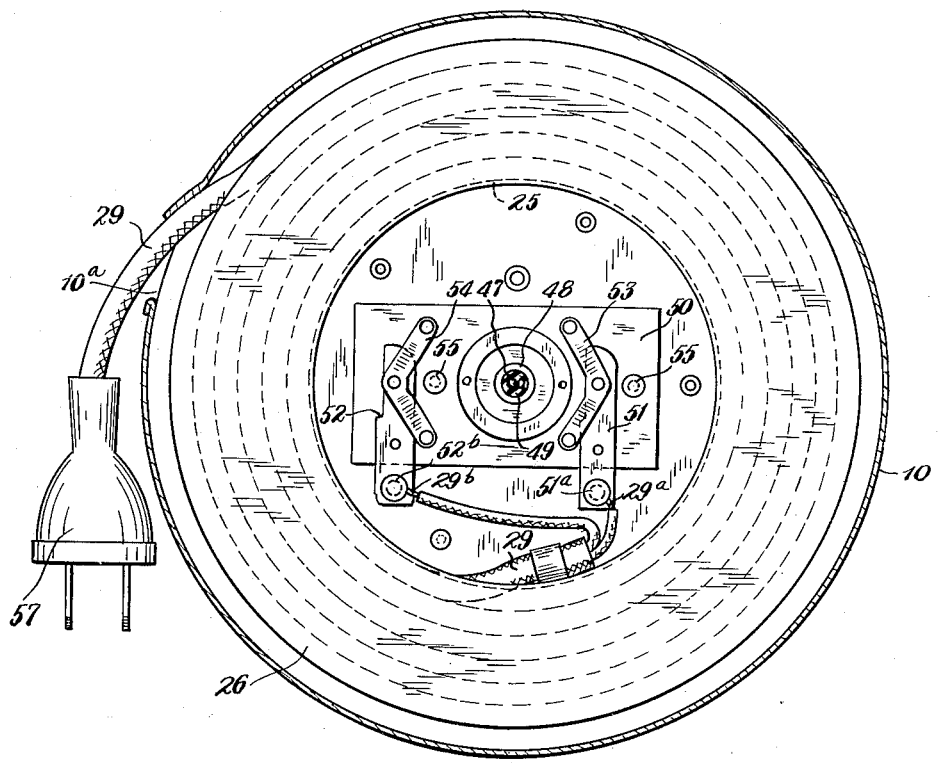
FIG. 3
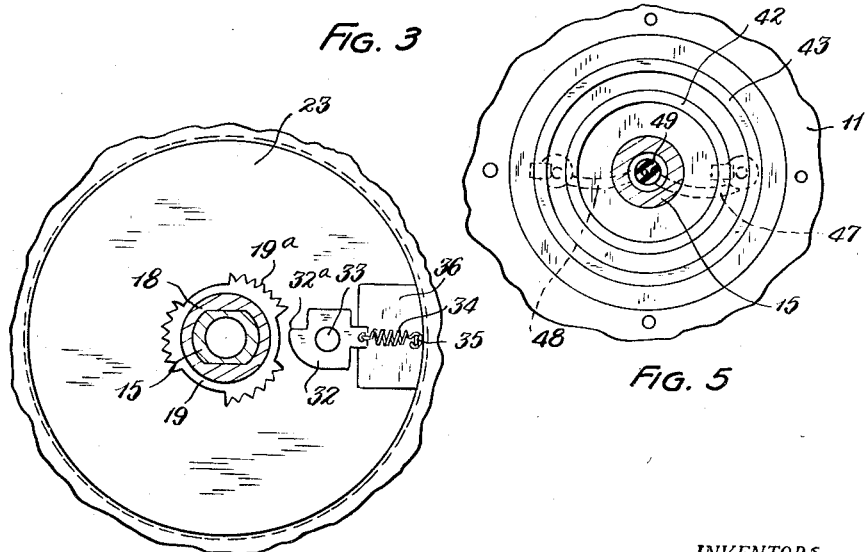
FIG. 4
FIG. 5
INVENTORS.
James E. Johnson,
Charles R. Girava,
BY
Hull & West,
ATTORNEYS Patented Aug. 21, 1951

2,565,452

UNITED STATES PATENT OFFICE 2,565,452

REEL

James E. Johnson and Charles R. Yirava, Cleveland, Ohio, assignors to Benjamin Reel Products, Inc., Cleveland, Ohio, a corporation of Ohio Application April 3, 1947, Serial No. 739,102

6 Claims. (Cl. 242—107)

This invention relates to reels, and more particularly to reels of the type whereon flexible members, such as electric wire cords are wound and from which the cords may be unwound in order to enable the plug-in connectors of said cords to be secured to the appropriate receptacles for operating various electrical appliances.

The general object of our invention is to produce a reel and reel assembly which is simple in construction and economical of production and which is convenient of manipulation. More specifically our invention relates to the type of reel shown, described and claimed in U. S. Patent No. 2,530,773, issued November 21, 1950, and to certain features of construction and arrangement of the parts whereby increased efficiency in operation is realizable and whereby a reel which is more capable of assembly-line production is obtainable.

Figure 1:
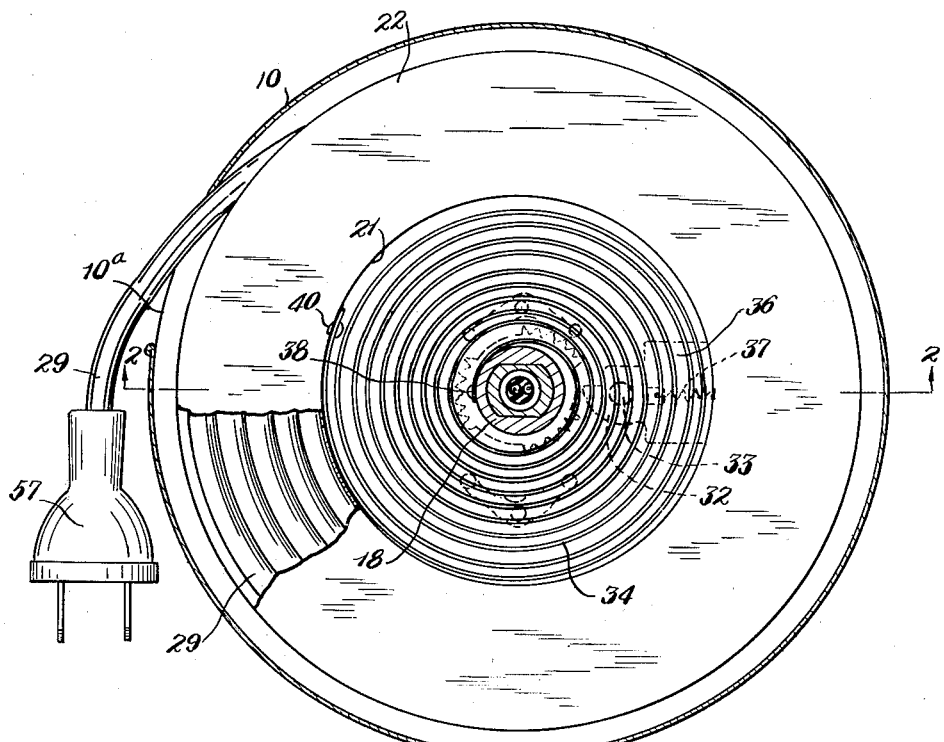
Figure 2:
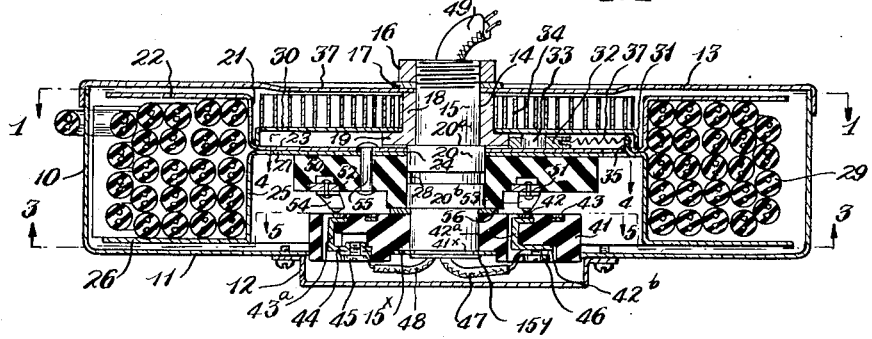

Further and more limited objects of the invention will be accomplished and realized by the construction and arrangement of the parts thereof as shown in the accompanying drawings, wherein Fig. 1 represents a sectional view of an embodiment of our reel assembly, the section being taken on the line 1—1 of Fig. 2 and looking in the direction of the arrows, the switch blades being displaced for clearness of illustration of the pawl and ratchet; Fig. 2 a sectional view taken on the line 2—2 of Fig. 1 and looking in the direction of the arrows; Fig. 3 a sectional view taken on the line 3—3 of Fig. 2 and looking in the direction of the arrows; Fig. 4 a detail in section taken on the line 4—4 of Fig. 2 and looking in the direction of the arrows; and Fig. 5 a detail in sectional plan view of the upper portion of the lower slip ring supporting member.

In the embodiment of our invention shown and described herein, the reel is of the type wherein an electric wire cord is wound upon the reel hub or drum, from which it can be unwound, against the resistance of a spirally coiled spring, by a pull exerted upon the said cord. The said embodiment includes a novel manner of effecting a connection between the inner ends of the cord wires and wires which may lead from the said reel to a desired point of use, also novel constructions of the reel drum and of the means for supporting the winding spring and the pawl which cooperates with the ratchet to retain the reel spool against rotation by said spring.

The particulars wherein the foregoing advantages may be realized will now be described, it being noted that, for convenience of description, the terms "top," "bottom," "upper" and "lower" will be employed herein in setting forth the relations of the parts to one another but without any intention thereby of limiting the positions which said parts shall actually occupy when the reel is in use.

Describing by reference characters the various parts shown in the drawings, 10 denotes the cylindrical side wall of a housing wherein the operating parts of the reel are located, it being noted that the bottom wall 11 is provided with a central opening 12, for access to the parts within the drum or hub portion of the reel. The housing is provided with a cover plate 13 which may be removably secured upon the top of the cylindrical wall 10 in any desirable manner, as by providing the same with a central opening 14 which is adapted to fit about the top of the central post 15 on which the reel is mounted for rotation, being detachably secured in place by means of a nut 16 threaded on top of said post, a washer 17 interposed between the bottom of said nut and the said cover and the bottom of the cover in turn being supported upon the top of a collar or sleeve 18 which surrounds the upper end of the post and is provided with a horizontal circular flange 19 at its bottom, the said flange in turn being supported upon a shoulder 20ᵃ provided at the top of an annular enlargement 20 of the said post.

Rotatably mounted upon the hollow shaft 15 is the spool portion of the reel. This portion, as shown, is made of an upper section and a lower section, preferably formed of sheet metal. The upper section is shown as provided with the vertical cylindrical wall 21 of the hub or drum portion from the upper end of which there extends a radially outwardly projecting annular retaining member 22. From the bottom of the hub or drum portion 21 an annular plate 23 extends radially inwardly, the same having a central opening 24 whereby it is rotatably received upon an enlarged cylindrical section 20 of the shaft 15, the top of the said section having an annular horizontal shoulder upon which the base of the sleeve 18 is supported. The lower spool section of the reel comprises a vertical cylindrical wall 25 which, together with the wall 21, constitutes the outer cylindrical wall of the hub or drum. An annular retaining member 26 projects radially outwardly from the bottom of the wall 25, forming with the wall 22 the retaining members of the ends of the hub or drum. An annular plate 27, similar to the plate 23, extends inwardly and is provided with a central opening 28 whereby it is rotatably received upon the enlarged portion 20 of the shaft 15. The plates 23 and 27 may be secured together in any convenient manner, as by spot welding, or by the means hereinafter to be described in connection with the means for delivering current from the wire cord 29 wound upon the hub or drum to conducting wires extending through the hollow shaft 15. The plates 23 and 27 also provide jointly the thickness of metal capable of supporting the drum upon top of the supporting member 50, to be described hereinafter.

30 denotes an annular plate surrounding the sleeve 18 and supported at its inner edge upon the flange 19. The outer circular periphery of the plate extends nearly to the wall 21 and is there provided with a downwardly extending flange 31 by means of which and the flange 19 the plate is supported by and spaced from the plate 23. This space is provided for the accommodation of a pawl 32 mounted upon a pivot stud 33 carried by the plate 23, the pawl having a nose 32ª presented toward cooperating groups of ratchet teeth 19ª projecting radially outwardly from and formed on the flange 19. A coil spring 34 is connected at one end to the tail of the pawl and at its other end to a stud 35 which is shown as formed by a tongue struck from the plate 27 and extending through an opening 36 provided therefor in the plate 23.

In the space defined by the drum wall 21 and the cover plate 13, there is located the spring 37, of the spiral clock-spring type by means of which the drum will be rotated in a direction to wind the wire cord 29 thereupon. One end of the spring is anchored, as by means of a rivet 38, to the sleeve 18 while its other end is connected to the wall 21 as by means of a rivet 40 (see Fig. 1).

41 denotes a lower annular supporting member of insulating material which is non-rotatably mounted on the bottom of the shaft 15, being supported thereupon by means of a washer 15ˣ which surrounds the lower reduced portion of the shaft and which is fitted within an annular recess 41ˣ in the bottom of the member 41, the lower end of the shaft being peened outwardly as shown at 15ʸ thereby to grip the washer and thus afford means whereby the shaft supports the supporting member 41 and the other portions of the reel assembly.

The lower supporting member is provided with inner and outer concentric conducting slip rings 42 and 43, respectively (such as shown in our application Serial No. 725,576, now Patent No. 2,530,773, dated November 21, 1950), embedded therein and extending to the upper surface thereof. The outer of these rings is provided with a leg 43ª extending downwardly therefrom and having an inturned flange 44 at the bottom; and the inner of said rings is provided with a similar downwardly extending leg 42ª having an outturned flange 42ᵇ at its bottom, the flanges 44 and 42ᵇ having screws 45 and 46 threaded thereinto, respectively, by means of which conductor wires 47 and 48, respectively, are secured to said flanges, these wires being enclosed within an insulating sheath 49 extending upwardly through the hollow shaft 15.

50 denotes a second supporting member of insulating material, also located within the wall 25 and having inner and outer conducting plates 51 and 52, respectively, the said conducting plates having brushes 53 and 54, respectively, secured thereto and the ends of which brushes are adapted to engage the slip rings 42 and 43, respectively.

To these plates 51 and 52 conductor wires 29ª and 29ᵇ from the wire cord 29 are connected, as by means of clamp screws 51ª and 51ᵇ, the wall 25 being provided with an opening (see Fig. 3) through which the inner end of the wire cord extends.

The lower portion of the supporting member 41 is shown as projecting within the central opening 12 of the housing. The upper supporting member 50 is conveniently supported from the annular plates 23, 27 as by means of elongated rivets 55, and a thrust washer 56 is interposed between an annular shoulder on the bottom of a lower enlarged portion 20b of the shaft 15 and the top of the lower annular supporting member 41.

The side 10 of the housing is provided with an opening 10ª through which the outer end of the wire cord 29 extends and which wire cord is shown as provided with any standard type of plug connector, such as indicated at 57.

As is the case with the reel construction shown in our aforesaid application Serial No. 725,576, the insulating supporting members, and the elements whereby current supplied to the conductors of the wire cord 29 may be delivered to the conductors or wires 49, are located within the central or drum portion of the reel, an arrangement which not only protects the current-transmitting elements from access of dust thereto, but which also contributes to the compactness of the entire reel assembly.

Still further, the manner in which the spool or reel is constructed enables the same to be produced as an assembly-line proposition, from light sheet metal, but which, due to the manner in which it is constructed, possesses all of the strength and rigidity which will enable it to withstand usage without deterioration over long periods of time.

Having thus described our invention, what we claim is:

1. A reel assembly comprising a spool having an upper and a lower section, the upper section comprising a vertical cylindrical drum member, a retaining member projecting radially outwardly from the top of the upper end of the cylindrical drum member and an annular plate extending radially inwardly from the bottom of said drum member, and the lower section having a vertical cylindrical drum member forming, with the first drum member, a complete drum, a retaining member extending radially outwardly from the bottom of the second drum member and an annular wall extending radially inwardly from the top of said second drum member, a central vertical shaft extending through the radially inwardly extending plates and upon which shaft the reel spool is mounted for rotation, a sleeve non-rotatably mounted on the said shaft and having an annular flanged base located above the annular inwardly extending plate of the first drum section, an annular plate mounted upon the said sleeve and supported at its inner portion by the said flanged base and etxending radially outwardly from said sleeve, a housing for the said spool, a cover for said housing, and a spiral spring of the clock-spring type interposed between the cover and the last mentioned plate and supported by the latter and secured at its inner end to the said sleeve and its outer end to the said spool.

2. In the reel assembly set forth in claim 1, the portion of the shaft between the said annular plates being provided with circumferentially spaced ratchet projections, a pawl pivotally supported between the said annular plates and having a nose presented toward and adapted to engage the said ratchet projections, a supporting member also located between the said annular plates, and a spring connecting the tail of the pawl with the said supporting member.

3. In the reel set forth in claim 1, the annular flanged base of the sleeve being provided with circumferentially spaced ratchet projections, a pawl pivotally supported between the radially inwardly extending plate of the first section and the plate extending radially outwardly from the sleeve and having a nose presented toward and adapted to engage the ratchet projections on the flange, a supporting member located within the space between the two last mentioned plates and adjacent to the outer edge of the plate which is supported by said flange, and a spring connecting the tail of the pawl with the said supporting member.

4. In the reel set forth in claim 3, the annular plate which is mounted upon the flanged base of the sleeve and which extends radially outwardly therefrom having a downwardly extending flange at its outer periphery adapted to engage the radially inwardly extending plate of the upper spool section, thereby to support such peripheral portion in spaced relation with respect to the last mentioned plate.

5. A reel assembly comprising a spool having a cylindrical drum member and an annular plate extending radially inwardly from said drum member, a central vertical shaft extending through the radially inwardly extending plate and upon which shaft the reel spool is mounted for rotation, a sleeve non-rotatably mounted on the said shaft and having an annular flanged base located above the annular inwardly extending plate of the spool, an annular plate mounted upon the said sleeve and supported at its radially inner portion by the said flanged base and extending radially outwardly from said sleeve, the outer edge of said second annular plate having a flange formed thereon extending axially inwardly of the reel to support such edge on said spool and form an annular chamber in the reel, and ratchet type lock means for the spool positioned in the said chamber.

6. A reel assembly comprising a spool having a cylindrical drum member and a plate extending radially inwardly from said drum member, a central vertical shaft extending through the radially inwardly extending plate and upon which shaft the reel spool is mounted for rotation, a sleeve non-rotatably mounted on the said shaft and having an annular flanged base, a disc mounted upon the said sleeve and supported at its radially inner portion by the said flanged base and extending radially outwardly from said sleeve, the outer edge of said disc having a flange formed thereon extending axially of the reel to support such edge on said spool and form an annular chamber in the reel, and lock means for the spool positioned in the said chamber.

JAMES E. JOHNSON.
CHARLES R. YIRAVA.

REFERENCES CITED

The following references are of record in the file of this patent:

UNITED STATES PATENTS

| Number | Name | Date |
|---|---|---|
| 1,106,821 | Lamb | Aug. 11, 1914 |
| 2,159,004 | Bosch | May 23, 1939 |
| 2,342,912 | White | Feb. 29, 1944 |
| 2,375,917 | Gross | May 15, 1945 |
| 2,391,840 | Meletti | Dec. 25, 1945 |